(12) United States Patent
Wang et al.

(10) Patent No.: US 7,820,068 B2
(45) Date of Patent: Oct. 26, 2010

(54) CHEMICAL ASSISTED LAPPING AND POLISHING OF METALS

(75) Inventors: Qi Wang, Birdsboro, PA (US); Donald L. Schuster, Springfield, OH (US)

(73) Assignee: Houghton Technical Corp., Wilmington, DE (US)

( * ) Notice: Subject to any disclaimer, the term of this patent is extended or adjusted under 35 U.S.C. 154(b) by 147 days.

(21) Appl. No.: 12/034,092

(22) Filed: Feb. 20, 2008

(65) Prior Publication Data

US 2008/0197112 A1 Aug. 21, 2008

Related U.S. Application Data

(60) Provisional application No. 60/890,957, filed on Feb. 21, 2007.

(51) Int. Cl.
*C09K 13/00* (2006.01)
(52) U.S. Cl. ...................................... 252/79.1
(58) Field of Classification Search ........................ None
See application file for complete search history.

(56) References Cited

U.S. PATENT DOCUMENTS

| | | | |
|---|---|---|---|
| 3,071,456 A | 1/1963 | Cheesman et al. | |
| 3,531,414 A * | 9/1970 | Keary et al. | 422/8 |
| 3,715,842 A * | 2/1973 | Tredinnick et al. | 451/36 |
| 3,979,858 A | 9/1976 | Semones et al. | |
| 4,038,048 A | 7/1977 | Thrower et al. | |
| 4,046,524 A | 9/1977 | Van Hesden et al. | |
| 4,181,540 A | 1/1980 | Ahlf et al. | |
| 4,491,500 A | 1/1985 | Michaud et al. | |
| 4,705,594 A | 11/1987 | Zobbi et al. | |
| 4,770,672 A | 9/1988 | Menard et al. | |
| 4,818,333 A | 4/1989 | Michaud et al. | |
| 4,906,327 A | 3/1990 | Michaud et al. | |
| 5,051,141 A | 9/1991 | Michaud et al. | |
| 5,158,623 A | 10/1992 | Michaud et al. | |
| 5,158,629 A | 10/1992 | Zobbi et al. | |
| RE34,272 E | 6/1993 | Michaud et al. | |
| 5,299,390 A | 4/1994 | Kato et al. | |
| 5,503,481 A | 4/1996 | Hashimoto et al. | |
| 5,538,462 A | 7/1996 | Gnadt et al. | |
| 5,855,633 A * | 1/1999 | Simandl et al. | 51/308 |
| 5,873,770 A | 2/1999 | Hashimoto et al. | |
| 6,120,355 A | 9/2000 | Stadtfeld et al. | |
| 6,217,415 B1 | 4/2001 | Ajayi et al. | |
| 6,217,421 B1 | 4/2001 | McGlasson et al. | |
| 6,236,542 B1 | 5/2001 | Hartog et al. | |
| 6,416,685 B1 | 7/2002 | Zhang et al. | |
| 6,569,215 B2 * | 5/2003 | Miyata | 51/307 |
| 6,569,350 B2 | 5/2003 | Kaufman et al. | |
| 6,732,606 B1 | 5/2004 | Zhu et al. | |
| 6,838,149 B2 | 1/2005 | Lugg et al. | |
| 7,005,080 B2 | 2/2006 | Holland et al. | |
| 7,029,373 B2 | 4/2006 | Ma et al. | |
| 2001/0030152 A1 | 10/2001 | Wright et al. | |
| 2004/0134873 A1 | 7/2004 | Yao et al. | |
| 2005/0014597 A1 | 1/2005 | Michaud et al. | |
| 2005/0037936 A1 | 2/2005 | Martyak et al. | |
| 2005/0164610 A1 | 7/2005 | Michaud et al. | |
| 2006/0111018 A1 | 5/2006 | Kopp et al. | |
| 2006/0131275 A1 | 6/2006 | Bian et al. | |
| 2006/0151071 A1 | 7/2006 | Bedard et al. | |
| 2006/0185184 A1 | 8/2006 | McGlasson et al. | |

FOREIGN PATENT DOCUMENTS

WO   WO 2005076871 A2 *   8/2005

OTHER PUBLICATIONS

Lin et al, Effects of Slurry Components on the Surface Characteristics when Chemcial Mechnical Polishing NiP/Al Substrate, Jan. 26, 2005, 483, Thin Solid Films, pp. 400-406.*
Marinescu, "Loose Abrasive Processes", Tribology of Abrasive Machining Processes, Chapter 13:500-530, Noyes, (2004).
Howes, "Manufacturing Technology Research Needs of the Gear Industry", A Manufacturing Technology Information Analysis Center Report, (Dec. 31, 1987).
Subramanian, "Finishing Methods", Surface Engineering, ASM Handbook, 5:79-164, ASM International, Materials Park, OH, (1994).
Sroka, "Superfinishing Gears: The State of the Art, Part II", Gear Technology, 30-32 (Jul./Aug. 2005).
Baypure ® DS 100 Solid G, Product Information Sheet, (Jul. 2004).
MicroSurface™ 5130 Product Data Sheet (Nov. 18, 2003).
MicroSurface™ 5130 Material Safety Data Sheet (Nov. 2003).
MicroSurface™ 5132 Product Data Sheet (Nov. 2003).
MicroSurface™ 5132 Material Safety Data Sheet (Nov. 2003).
MicroSurface™ 5142 Product Data Sheet (Aug. 2007).
MicroSurface™ 5142 Material Safety Data Sheet (Sep. 7, 2006).
MicroSurface™ 3305-15 Material Safety Data Sheet (Sep. 8, 2006).

* cited by examiner

*Primary Examiner*—Binh X Tran
*Assistant Examiner*—Stephanie Duclair
(74) *Attorney, Agent, or Firm*—Howson & Howson LLP

(57) ABSTRACT

Compositions for lapping gears and methods for preparing the same are described. These compositions contain a salt of polyaspartic acid and may contain additional components that are useful for lapping gears. Also provided are processes for using the compositions described herein.

11 Claims, No Drawings

CHEMICAL ASSISTED LAPPING AND POLISHING OF METALS

CROSS-REFERENCE TO RELATED APPLICATIONS

This application claims the benefit of the priority of U.S. Provisional Patent Application No. 60/890,957, filed Feb. 21, 2007.

BACKGROUND OF THE INVENTION

This application is related to metallic surface finishing and, specifically, to chemical assisted lapping and polishing of metallic surface, e.g., gears, using aqueous based carriers.

Lapping and polishing are widely used precision finishing processes for many objects made of a variety of materials including glass, ceramic, plastic, semiconductor metals, metals and their alloys (Loose Abrasive Processes, Chapter 13, in *Tribology of Abrasive Machining Processes* by I. D. Marinescu et al, Noyes, 2004). The objects suitable for the two processes are also diverse in terms of their sizes, shapes, and functions.

Gears are fundamental and essential components of transmission equipment, which are used for construction of both military and civilian machinery. Most high performance gears today are still made with steel and are manufactured by first machining the steel into a blank followed by cutting to form teeth. The rough gears are then heat treated and finished with varying methods depending on requirement of the gear specifications. Surface smoothness is an important parameter in evaluating gear performance. Generally speaking, the finely finished gear teeth could reduce the amount of friction between the contact surfaces, minimize pitting, scuffing, and wear, thus prolonging working life of gears. In addition, it also reduces the harmonic noise when gears are in use. Improvement in gear manufacturing technology has always been an interest for many parties (Manufacturing Technology Research Needs of the Gear Industry, A Manufacturing Technology Information Analysis Center Report by M. A. H. Howes, December 1987).

U.S. Pat. No. 6,732,606 discusses that an optimally finished gear should have a surface roughness between approximately 5 micro-inches Ra to 10 micro-inches Ra. The reduced surface roughness, when located at the gear teeth, can reduce the maximum contact stress by more than fifty percent. The subsurface shear stress can be reduced by approximately thirty percent. Various finishing methods to achieve the stated Ra are provided, including examples such as electrochemical polishing and physicochemical polishing.

Even though many methods are available for gear finishing (Finishing Methods, in Surface Engineering, ASM Handbook, Vol. 5, page 79-164, ASM International, Materials Park, Ohio, 1994), lapping is by far the most well established process for finishing the tooth surfaces of a pair of gears, which are used in mesh with each other, especially for bevel gears. During lapping, loose abrasive slurry, referred as lapping compound, is introduced to the meshing tooth surface of two gears under load conditions, usually through nozzles near the meshing point of the teeth. The process is usually involved using specialized and expensive lapping machinery. U.S. Pat. Nos. 6,217,421, 6,120,355, 5,538,462, 5,299,390 and US Patent Application Publication Nos. US-2001/0030152, US-2006/0111018, and US-2006/0185184 represent recent innovations in designing of the lapping equipment.

The lapping compound typically includes abrasive grains or grits suspended in a liquid carrier. The abrasive grains or grits provide the action force of abrading under pressure and the liquid carrier provides a vehicle that suspends the abrasives and lubricates or cushions the interface to minimize metal to metal contact, reducing potential surface damage and heat formation. Typically, machines using traditional lapping compounds must be operated under high pressures for optimal production efficiency. However, under such conditions, the cutting edges of the grains and grits are worn out easily, rendering frequent change over of lapping compound for disposal.

Historically, oil-based carriers are used in the formulations for the lapping compounds. Suitable liquids include kerosene, diesel fuel, mineral oil, seal oil, spindle oil, and vegetable oil. In certain cases, heavy oils, greases and animal fats may also be used in the composition of the carrier. To improve the oil based carrier, a variety of oil soluble chemicals may be added. For example, U.S. Pat. Nos. 4,046,524 and 4,770,672 refer to oil-based lapping compositions. Use of an oil based carrier as a vehicle for lapping operations suffers from several shortcomings including the need for heavy cleaning of processed parts, expensive waste disposal of used lapping compound, and potential slip and fall hazard for lapping operators. In addition, the ever-increasing crude price also makes the oil based lapping process less competitive.

Water based lapping compounds have also been proposed in the art. See, for example, U.S. Pat. Nos. 4,038,048 and 5,855,633 in which the aqueous carrier, like oil based carrier, strictly serves as a vehicle to suspend loose abrasives and provide certain degrees of lubricity.

Chemical assisted mechanical finishing has long been known and gained wide acceptance in the semiconductor industry. Chemical mechanical planarization (CMP) is now an integrated process in semiconductor chip manufacturing and continues to be a subject of active research, seeking improvement on all aspects of the technology. See, US Patent Application Publication Nos. US-2006/0131275, US-2005/0037936, and US-2004/0134873 and U.S. Pat. Nos. 7,029,373, 6,838,149, 6,569,350, 6,416,685, and 6,236,542. The technology usually uses strong and aggressive chemicals to help remove unwanted metals on the chip surface. The common chemicals used by these processes include hydrofluoric, hydrochloric, nitric acids, hydrogen peroxide and other oxidants. Due to the aggressive nature of the chemicals, sophisticated process control is incorporated in the technology to avoid over-finishing.

In the metalworking industry, chemical assisted finishing also utilizes strong acids for metal surface finishing, which tends to etch pits and scratches deeper on the processed metal parts, making the process difficult to control, even though processes using mild acids such as in U.S. Pat. No. 3,979,858 might alleviate the problem to certain degrees. Over all, careful process control is required.

To avoid the potential problem, U.S. Pat. No. 3,071,456 refers to the use of "surface conversion agents", which form a friable layer on metal surface, with the metal removal on the surface being not only accelerated, but also selective, avoiding the phenomenon of deepening pits and scratches on the metal surface normally associated with conventional acid system. The "surface conversion agents" include various phosphoric acids and their salts, nitro compounds, organic acids such as citric and oxalic acids. Also discussed is barrel finishing, a form of vibratory mass finishing, using abrasive media. However, the oxalic and phosphorus based conversion coatings suffer from operation inefficiency, partly due to the limited solubility of these reagents in water, especially the salts of the same.

Still other proposals for metalworking or finishing compositions and processes are provided by U.S. Pat. Nos. 4,181,540; 4,491,500; 4,705,594; 4,818,333; 3,071,456; 4,906,327 (RE 34,272); 5,051,141; 5,158,623; 5,158,629; 7,005,080; and 4,818,333 and US Patent Application Publication No. US-2005/0164610. Other documents also address applications of the conversion coating assisted finishing in production of bearings and gears, such as U.S. Pat. Nos. 5,503,481 and 5,873,770. Chemically accelerated vibratory gear finishing using high density, non-abrasive ceramic media is also known. Publications related to this subject include G. Sroka and L. Winkelmann titled as "Superfinishing Gears" in July/August 2005 issue of Gear Technology, pages 30-32 and US Patent Application Publication No. US-2005/0014597. A related process is also discussed in U.S. Pat. No. 6,217,415.

To summarize, the conversion coating assisted chemical finishing process is normally practiced using vibratory mass finishing equipment. The media used in the vibratory equipment could be either abrasive or non-abrasive. In practice, the conversion coating assisted finishing processes in the art suffer from operation inefficiency. Generally, the processes need a minimum of several hours to achieve the desired smoothness of metal surface, as discussed above. This time frame is unacceptable for lapping operations, since it involves expensive lapping machinery and usually processes one item at a time. For example, commercial gear lapping only allots a few minutes for a pair of gears.

There remains a need in the art for alternate and improved compositions and methods for lapping gears efficiently.

SUMMARY OF THE INVENTION

In one aspect, a composition useful for polishing metal is provided and contains a salt of polyaspartic acid and one or more chemical compounds useful for polishing a metal substrate. In one embodiment, the composition contains at least about 9% by weight of the salt of polyaspartic acid. This composition is useful as a gear lapping composition.

In another aspect, a composition useful for polishing metal contains a salt of polyaspartic acid, a grit; and one or more chemical compounds useful for polishing a metal substrate.

In a further aspect, a composition useful for polishing metal, e.g., gear lapping, contains water, at least 9% by weight of a sodium salt of polyaspartic acid, sodium 3-nitrobenzenesulfonate, citric acid, sodium tripolyphosphate, anhydrous monosodium phosphate, disodium dihydrogen pyrophosphate, and sodium carboxymethyl cellulose.

In still another aspect, such a composition contains water, the sodium salt of polyaspartic acid, sodium 3-nitrobenzenesulfonate, citric acid, sodium tripolyphosphate, anhydrous monosodium phosphate, disodium dihydrogen pyrophosphate, a grit, and sodium carboxymethyl cellulose.

In yet a further aspect, processes for polishing metal surfaces are provided and include polishing a metal substrate surface using one or more compositions described herein.

In another aspect, processes for lapping gears are provided and include lapping gears using one or more compositions described herein.

In still a further aspect, processes for preparing one or more of the compositions described herein are provided and include mixing the components of said composition using a pump at room temperature.

In yet another aspect, a product is provided and includes one container containing at least about 3% by weight of a salt of polyaspartic acid and one or more chemical compounds useful for finishing a metal substrate and a second container containing a grit.

In a further aspect, methods are provided for recycling grits from used compositions.

In yet another aspect, methods are provided for recycling used compositions.

Other aspects and advantages of the invention will be readily apparent from the following detailed description of the invention.

DETAILED DESCRIPTION OF THE INVENTION

In view of the deficiencies in the art discussed above, novel compositions for treating metal substrates were developed that contain salts of polyaspartic acid and aqueous carriers. These compositions are more successful in removing the surface layers of metal substrates. These novel compositions also permit the use of lower pressures during the processes of using the compositions. Reducing the pressures slows the wearing of the abrasives utilized in the compositions, ultimately prolonging the life of the compositions. The amount of waste generated during the processes, i.e., lapping or metal polishing, is reduced and the costs associated with these processes are lowered. The compositions described herein provide lapping and polishing processes that run efficiently at reduced pressures. The compositions and processes using the same also provide easy cleaning of the processed metal substrate and processing equipment, reducing lapping and polishing operating costs, simplifying waste disposal, and eliminating the slip and fall hazards associated with currently utilized oil based lapping compositions.

In view thereof, compositions and processes for metallic surface finishing are described herein. The term "metallic surface finishing", or variations thereof, as used herein refers to treating a metallic surface. The processes described herein which utilize the novel compositions include chemical assisted lapping and polishing of metallic surfaces. In particular, chemical assisted lapping and polishing of a variety of metal substrates, especially gears, is provided.

The term "metal substrate" or "metallic substrate", or variations thereof, as used herein includes any metal substrate that contains one or more of a metal, as understood to those skilled in the art. In one embodiment, the metal substrate includes one metal or a combination of metals, i.e., metal alloys. In another embodiment, the metal includes iron, manganese, copper, aluminum, chromium, cobalt, molybdenum, nickel, titanium, tungsten, vanadium, zirconium, magnesium, among others, and alloys thereof. The metal substrate may contain one or more additional non-metallic components including carbon, silicon, sulfur, phosphorus, among others. The compositions described herein are especially useful for coating metal substrates that contain iron, including iron alloys. In one embodiment, the compositions provided herein are useful for treating steel.

A. Lapping and Polishing Compound Composition and Preparation Thereof

The compositions described herein are therefore useful for treating metal substrates and contain one or more of a carrier, an active chemical capable of reacting with a metal substrate, and a salt of polyaspartic acid. In one aspect, the compositions provided herein contain a salt of polyaspartic acid, one or more chemical compounds useful for polishing a metal substrate, i.e., "active chemicals", and, optionally, a grit.

Among useful salts of polyaspartic acid for inclusion in the compositions described herein are water-soluble salts of polyaspartic acid. In one embodiment, the salt is an alkali metal, amine, ammonium or phosphonium salt of polyaspartic acid. Desirably, the alkali metal salt of polyaspartic acid includes the lithium, potassium and sodium salt of polyaspartic acid. In one embodiment, the salt is the sodium salt of polyaspartic acid. The sodium salt of polyaspartic acid has several purposes in the compositions provided herein. In one aspect, the sodium salt of polyaspartic acid acts as a metal chelating agent. In another aspect, the sodium salt of polyaspartic acid acts as a surfactant. In yet a further aspect, the sodium salt of polyaspartic acid acts as an accelerator.

In one embodiment, the composition contains at least about 0.1 to about 15% of the sodium salt of polyaspartic acid. In another embodiment, the composition contains at least about 3% by weight of the sodium salt of polyaspartic acid. In one example, the composition contains up to about 15% of the sodium salt of polyaspartic acid. In a further example, the composition contains about 0.01 to about 12% by weight of the sodium salt of polyaspartic acid. In another example, the composition contains about 3% to about 15% by weight of the sodium salt of polyaspartic acid. In a further example, the composition contains about 9% to 15% by weight of the sodium salt of polyaspartic acid. In another example, the composition contains about 9.5% to about 15% by weight of the sodium salt of polyaspartic acid. In still a further example, the composition contains about 9.7 to about 15% by weight of the salt of polyaspartic acid. Thus, for example, the composition can contain in percentages by weight at least about 0.1, 0.5, 1, 2, 3, 4, 5, 6, 7, 8, 9, 10, 11, 12, 13, or 14 to at least about 15%, and fractional percentages by weight therebetween of the sodium salt of polyaspartic acid.

In one embodiment, the composition contains loose grains and grits. The terms "grits", "grains", "loose grains", "loose grits", and "loose grains and grits" may be used interchangeably and include inorganic and organic materials that may be utilized to treat a metal substrate surface, including metal polishing. The loose grains and grits are prepared from a variety of inorganic and organic materials known to the skilled artisan. The inorganic materials include, but are not limited to, diamond, cubic boron nitride, silicon carbide, aluminum oxide, 38 white aluminum oxide corundum, garnet, quartz, glass, alumina, chromium oxide, silica oxide, carborundum, emery, ceramic, titanium oxide, manganese oxide, zirconium oxides, hafnium oxides, tungsten oxides, vanadium oxides, niobium oxides, tantalum oxide, molybdenum oxides, and other suitable metal oxides and their mixtures. Organic materials for these grits include, without limitation, various homo and co-polymers, preferably with polymers having certain degrees of cross-linking either via covalent or ionic bonds. The polymers include, but are not limited to, polyvinyl chloride and other chlorinated polymers, Teflon® polymer and related fluoropolymers, polymethacrylate, polyacrylate, polyethylene, polypropylene, polybutylene, polystyrene, polyvinylacetate, polyesters, polyamides, polyimides, polysiloxanes, polyethers, polyamines, polythioethers, polylactones, polylactamides, polycarbonate, and their co-polymers and cross-linked polymers. Both synthetic and natural rubbers, either modified or unmodified are possible organic materials. Further, polymers with a core shell structure are also preferred and the polymers may be functionalized with a variety of functional groups such as acidic group. Examples in this category include the Nafion® H reagent and the acid form of the Amberlyst® reagent, the sulfonated divinylbenzene/styrene polymer. Composite materials made with both inorganic chemicals and organic polymers are also included. In one example, the loose grains and grit include zirconium oxides, aluminum oxides, hafnium oxides, and combinations thereof.

The average particle size of the loose grains and grits useful herein are about 0.1 µm to about 100 µm in diameter. This particle size includes grits of a diameter of at least 0.1, 0.5, 1, 10, 20, 30, 40, 50, 60, 70, 80, 90 and 100 µm, including integers and fractional diameters therebetween. In one example, the average particle size of the grit is about 20 to about 25 µm in diameter. In another example, the average particle size of the grit is about 4 to about 50 µm in diameter. In a further example, the average particle size of the grit is about 10 to about 40 µm in diameter. However, coarse particles, i.e., larger than 5 µm particles in diameter, may be desired for easy recycling of the spent compositions. The particles of the loose grains and grits may also be irregularly shaped, may contain sharp edges, may be spherical, or may be spherical without much cutting action. Typically, the loose grains and grits are present in the composition up to about 95% by weight of the final composition. In one embodiment, the loose grains and grits are present in the composition at about 25% up to about 95% by weight of the final composition. The percentage by weight of the grits in the compositions therefore include at least about 25, 35, 45, 55, 65, 75, 85 and 95%, including integers and fractional percentages therebetween. In one example, the loose grains and grits are present in the composition at about 25 to 75% by weight. In one example, the loose grains and grits are present the composition at about 68% by weight.

The composition described herein desirably contains a carrier. In one example, the carrier is an aqueous carrier. In one embodiment, the carrier is included in the composition, thereby permitting use of the product by the customer without addition of further carrier. In another embodiment, the carrier is present in the composition in sufficient amounts to provide a stable solution for further dilution by the customer prior to use. In another embodiment, the carrier is added by the customer to a concentrated composition prior to use. In one embodiment, the carrier includes water. In one example, the composition contains about 10 to about 30% by weight water. In another example, the composition contains about 30% by weight water. In another example, the composition contains about 24% by weight. However, more water may be added to the composition to ensure that the final composition contains sufficient water for use by the customer. Typically, the final composition utilized for the metal polishing or gear lapping contains about 85% by weight water. Thus, a composition as described herein may contain carrier in a percentage by weight of at least 10, 20, 30, 40, 50, 60, 70, 85, up to about 85%, including integers and fractional percentages therebetween.

The composition may also include one or more of an active chemical. The term "active chemical" as used herein refers to a chemical compound that is capable of interacting, e.g., reacting, with a metal substrate surface. The active chemical is desirably capable of removing layers of metal atoms from a metal substrate. Thus, a composition as described herein may contain an active chemical in a percentage by weight of at least 3, 5, 10, 15, 20, 25, 30 and up to about 35%, including integers and fractional percentages therebetween. Desirably, the active chemicals are present in the composition at up to about 45% by weight. In one example, the remaining components of the composition are present at about 3 to about 35% by weight.

In one embodiment, the active chemical is an acid and/or a salt of that acid in monomeric, oligomeric, and/or polymeric forms, or combinations thereof. In one example, the active chemical is a strong inorganic acid including, without limitation, hydrofluoric, hydrochloric, nitric, sulfuric, sulfamic, hexafluorophosphoric, hexafluorosilicic, hexafluorozirconic, hexafluorotitanic, fluorosulfonic, tetrafluoroboric, phosphoric, pyrophosphoric, tripolyphosphoric, metaphosphoric, orthophosphoric, polyphosphoric, or thiophosphoric acid. In another example, the active chemical is a salt of an acid including, but not limited to, ammonium hydrogen difluoride, ammonium fluoride, ammonium hexafluorosilicate, ammonium hexafluorozirconate, ammonium hexafluorotitanate, phosphate salts such as ammonium phosphate, ammonium pyrophosphate, ammonium polyphosphate, ammonium hexafluorophosphate, potassium hexafluorophosphate, potassium phosphate, potassium pyrophosphate, potassium polyphosphate, sodium hexafluorophosphate, sodium polyphosphate, sodium phosphate, or sodium pyrophosphate, potassium hydrogen difluoride, potassium fluoride, potassium hexafluorosilicate, potassium hexafluorozirconate, potassium hexafluorotitanate, sodium hydrogen difluoride, sodium fluoride, sodium hexafluorosilicate, sodium hexafluorozirconate, sodium hexafluorotitanate; zinc, manganese, ferrous, and ferric salts thereof, and phosphorus and thiophosphorus acids. In a further example, the composition contains one or more of a phosphate salt. In yet another example, the composition contains sodium tripolyphosphate, anhydrous monosodium phosphate, disodium dihydrogen pyrophosphate, or any combination thereof. When the composition contains one or more of a phosphate salt, the total phosphate salts is up to about 15% by weight of the composition. Thus, for example, the composition may contain in percentages by weight of at least 0.01, 0.05, 0.1, 0.5, 1, 2, 3, 4, 5, 6, 7, 8, 9, 10, 11, 12, 13, or 14 to at least about 15%, and fractional percentages by weight therebetween of the phosphate salt. In another example, the composition contains about 0.01 to about 15% by weight of phosphate salts. In a further example, the composition contains about 0.01 to about 10% by weight of phosphate salts. In another example, the composition contains up to about 5% by weight of each phosphate salt. In yet another example, the composition contains about 0.01 to about 5% by weight of each phosphate salt. In a further example, the composition contains about 0.01 to about 3% by weight of each phosphate salt. In another example, the composition contains about 2.4% by weight of each phosphate salt. In still a further example, the composition contains sodium tripolyphosphate at about 1.2% by weight. In yet another example, the composition contains anhydrous monosodium phosphate at about 0.1% by weight. In still a further example, the composition contains disodium dihydrogen pyrophosphate at about 1% by weight.

In another embodiment, the active chemical includes a metal chelating agent. The term "metal chelating agent" as used herein refers to a chemical compound that binds to a metal substrate. Desirably, the composition described herein includes a salt of a polyamino acid, such as polyaspartic acid. In one embodiment, the salt of polyaspartic acid is the sodium salt of polyaspartic acid. Additional metal chelating agents may be included in the composition and include, without limitation, fluorides, ammonia, sodium and sodium thiocyanate, di and polyamines, EDTA, polyphosphates, aminocarboxylic acids and their polymers, 1,3-diketones, hydroxycarboxylic acids, phosphonic acids, oximes, Schiff bases, crown ethers, polyethers, poly and cyclic sulfur compounds, polyacrylate, polymethacrylate, polymethacryloyl acetate, polyvinyliminodiacetic acid, polyvinylpyrrolidone and its copolymers, polyamines, and other polymers such as poly(p-vinylbenzyliminodiacetic acid) and polymethacryloylacetone. Additional metal chelating agents may be selected by one skilled in the art for use in the compositions described herein and include those provided in Chelating agents, in Kirk-Othmer Encyclopedia of Chemical Technology, 4$^{th}$ Edition, Volume 5, page 764, which is hereby incorporated by reference. In one embodiment, the metal chelating agent is sodium, potassium, and ammonium fluorides, thiocyanates, polyphosphates, and the sodium salt of polyaspartic acid. In another embodiment, the metal chelating agent is the sodium salt of polyaspartic acid.

In still a further embodiment, the active chemical includes an organic acid. In one example, the active chemical includes a strong organic acid including, but not limited to, methanesulfonic, benzenesulfonic, toluenesulfonic, trifluoromethanesulfonic, trifluoroacetic, phytic, glycerophosphoric, 2-ethylhexyl phosphoric, butylphosphonic acids and ammonium, potassium, and sodium salts of these acids. In another embodiment, the active chemical includes weak organic acids including, but not limited to, formic, acetic, and other $C_2$ to $C_{18}$ carboxylic acids in straight or branched chains optionally functionalized with hydroxyl, carbonyl, thiocarbonyl, mercapto, amino, and other functional groups. Examples of $C_2$ to $C_{18}$ carboxylic acids useful in the composition contain glycolic, thioglycolic, lactic, gluconic, and a variety of amino acids, either synthetic or natural. Di, tri, and tetra-carboxylic acids and their anhydrides such as oxalic, malonic, succinic, malic, thiomalic, tartaric, maleic, glutaric, adipic, citric, oligomeric and polymeric carboxylic acids based on $C_2$ to $C_{18}$ monomers such as polyacrylic, polymethacrylic, polyaspartic, polyglutamic, and other polyaminodicarboxylic acids, as well as their salts are also examples of active chemicals that may be included in the compositions. Desirably, one active chemical in the composition is oxalic acid. The salts of ammonium, sodium, potassium, zinc, magnesium, ferrous, ferric, quaternary ammonium, phosphonium, and small water-soluble organic amines are further included for these weak organic acids. In one example, the composition contains citric acid. Desirably, the acid is present in the composition at up to about 15% by weight. Thus, for example, the composition may contain percentages by weight of at least about 0.1, 0.5, 1, 2, 3, 4, 5, 6, 7, 8, 9, 10, 11, 12, 13, or 14 to at least about 15%, and fractional percentages by weight therebetween, of the acid. In one example, the composition contains about 0.1 to 10% by weight of the acid. In another example, the composition contains about 1.6% by weight of the acid.

In yet a further embodiment, the active chemical may include dichromates, molybdates, zirconates, manganates, and other metal based oxo compounds, either in higher or lower valent states. High valence halogen compounds such as perchlorate and periodate may also be used as the active chemical. In one example, the active chemical is sodium dichromate, potassium dichromate, sodium molybdate, potassium molybdate, sodium zirconate, and potassium zirconate.

In still a further embodiment, the active chemical may include oxidizing agents including, without limitation, hydrogen peroxide, inorganic peroxides such as percarbobates, perborates, persulfate, or perphosphates, or organic hydroperoxides and peracids such as t-butyl hydroperoxide, cumene hydroperoxide, 2-methyl-2-hydroperoxy-5-hydroxy-pentane, peracetic acid, or perbenzoic acid. Various in situ generated peroxy compounds may also be included in the composition, which are stabilized by chemical compounds, including those discussed in U.S. Pat. Nos. 4,636,368, 4,064, 064, 4,059,678, 4,203,765 and 4,557,935, which are hereby incorporated by reference. In one example, the composition includes hydrogen peroxide.

In yet another embodiment, the active chemical contains one or more of an accelerator. The term "accelerator" as used herein refers to a chemical compound that speeds up a chemical reaction with a metal substrate surface. A variety of accelerators are useful in the composition. In one example, the accelerator is nitro and nitroso containing compounds, both organic and inorganic, including, but is not limited to, sodium nitrate, sodium nitrite, ammonium nitrate, ammonium nitrite, potassium nitrate, potassium nitrite, sodium and sodium salts of 2,4-dinitrobenzenesulfonic and dinitrobenzoic acids, sodium and potassium salts of 3-nitrobenzenesulfonic acid, dinitroanilines, naphthol yellow S, and cupferron. Hydroxylamines, amine oxides, quinones, nitronium and nitrosonium salts, and amino carboxylic acids and their polymers may also be used as accelerators. Metallic salts including ferrous and ferric sulfate are also used as an accelerator in the compositions described herein. In one embodiment, the accelerator is sodium nitrate, potassium nitrate, nitrite, 3-nitrobenezenesulfonate, naphthol yellow S, and polyaspartic acid and its sodium salt. In another embodiment, the accelerator is 3-nitrobenzenesulfonate. Typically, the accelerator is present at up to about 5% by weight. Thus, for example, the composition may contain in percentages by weight at least about 0.01, 0.05, 0.1, 0.5, 1, 2, 3, or 4 to about 5% of the accelerator, and fractional percentages by weight therebetween, of the accelerator. In one example, the accelerator is present at about 0.01 to about 3% by weight. In another example, the accelerator is present at about 0.1% by weight.

In a further embodiment, the active chemical is a surfactant and is added as component of the composition. The surfactant is particularly useful as a wetting and/or slipping agent, which use may be determined by one skilled in the art. The surfactant can be anionic, cationic, nonionic, or amphoteric. Useful surfactants include, but are not limited to, alkyl aryl sulfonate, fatty acid salts, alkoxylated fatty amines and alcohols, alkylated amines, ether carboxylic acids and its salts, and lecithin. The surfactant also includes polyhydroxy containing compounds and water soluble polymers and includes, without limitation, polyalkylene glycols including ethylene glycol, propylene glycol, butylenes glycol, and hexylene glycol, sugar alcohols, sugar, sugar molasses, polyvinylalcohol, sulfonated polyvinylstyrene, poly(acrylic/styrene) copolymer, polyvinylpyrrolidone and its copolymers, polyacrylate, polyoxazolines, and salts of polyamino carboxylic acid such as the sodium salt of polyaspartic acid. In one embodiment, the surfactant includes alkoxylated fatty alcohols and the sodium salt of polyaspartic acid.

In still a further embodiment, the active chemical is a slipping agent. A number of slipping agents are available for use in the composition and include glycerol, without limitation.

In another embodiment, the composition includes rust preventives, which may be determined by one skilled in the art, as an active chemical. Rust preventatives that are useful in the compositions described herein include, but are not limited to, sodium nitrite, potassium nitrite, benzoic acid, benzoic acid salts, dicarboxylic acids, dicarboxylic acid salts, benzotriazoles, tolyltriazoles, and quaternary ammonium salts, including the rust preventatives marketed by Lonza and the rust preventives provided in catalogs such as "TecGard Metalworking Additives" (Afton Chemical) and "Metalworking Specialties" (PCC Chemax), which catalogs are hereby incorporated by reference. In one embodiment, the rust preventive is sodium nitrite, salts of dicarboxylic acids, benzotriazoles, and tolyltriazoles.

To prevent biological growth in the composition, either in storage or during use thereof, biocides are optionally included as an active chemical. The addition of the biocide depends on the requirements of the manufacturing process and other components on the formulation and can be determined by one skilled in the art. Biocides useful in the composition include, but are not limited to, formaldehyde releasing chemicals, isothiazolin-3-ones, glutaraldehyde, quaternary ammonium and phosphonium salts, including the biocides described in catalogs such as "Industrial Biocides", 2005 (ISP) and "Dowicide A Antimicrobial", 1983; "Dowicil 75", 1981; and "Dowicil QK-20 Antimicrobial", 1999 (Dow Chemical), which are hereby incorporated by reference.

In other embodiments, an antioxidant is added to the composition as an active chemical to prolong the useful life of the composition. The addition of the antioxidant depends on the requirements of the manufacturing process and other components on the formulation and can be determined by one skilled in the art. Examples of useful antioxidants include phenolic based antioxidants, amine based antioxidants, or a combination thereof. Ascorbic and citric acids, as well as non-phenolic antioxidants as discussed in U.S. Pat. Nos. 7,053,139 and 7,019,055, which are hereby incorporated by reference, are also included in the composition in certain embodiments. In one embodiment, the antioxidant includes phenol and amine based antioxidants.

In another embodiment, leveling agents or burnishing compounds are included in the composition as an active chemical(s). The addition of the leveling agent depends on the requirements of the manufacturing process and other components on the formulation and can be determined by one skilled in the art. Examples of leveling agents include those utilized in the electroplating industry and include, but are not limited to, 2-butene-1,4-diols, 2-butyne-1,4-diols, urea, thiourea, sodium saccarin, and organic quaternary ammonium salts. The inventors found that the use of leveling agents in the composition improved the lapping and polishing effect of the processed metal objects.

In still other embodiments, a thickening agent is incorporated into the composition as an active chemical. The addition of the thickening agent depends on the process requirements and the other components of the composition. The thickening agent includes, without limitation, xanthan gum, modified cellulose polymers, agar, modified and unmodified starch, chitin, chitosan, other polysaccharides, partially hydrolyzed polyvinylacetate, polyvinylalcohol, polyvinylpyrrolidone and its copolymers, polyacrylate, polyoxazolines, polyethers, polyamines, aluminum salts of fatty acids, and certain minerals. In one embodiment, the thickening agent is chitosan or sodium carboxymethylcellulose. In another embodiment, the thickening agent is sodium carboxymethylcellulose. The thickening agent is typically present in the composition at up to about 5% by weight. Thus, for example, the composition may contain in percentages by weight at least about 0.01, 0.05, 0.1, 0.5, 1, 2, 3, or 4 to about 5%, and fractional percentages by weight therebetween, of the thickening agent. In one example, the thickening agent is present in the composition at about 0.01 to about 2% by weight. In another example, the thickening agent is present in the composition at about 0.6% by weight. It should be understood that all integers and fractional percentages of between 0.01 to about 2% by weight are included within this range.

A pH adjustor or buffer is added as a component of certain embodiments of the composition as an active chemical to adjust pH. Examples of useful pH adjustors or buffers include, without limitation, sodium hydroxide, potassium hydroxide, ammonium hydroxide, sodium carbonate, potassium carbonate, ammonium carbonate, sodium bicarbonate, potassium bicarbonate, ammonium bicarbonate and other basic compounds such as water-soluble amines including alkanolamines such as monoethanolamine or triethanolamine. In one embodiment, the pH adjustor is sodium hydroxide, sodium carbonate, or citric acid. Desirably, the pH of the composition is about 0.5 to about 13 depending on the chemicals used in the specific formula. Thus, the pH range includes 0.5, 1, 2, 3, 4, 5, 6, 7, 8, 9, 10, 11, 12, and 13 as well as fractional pH numbers therebetween. In one embodiment, the pH is about 2 to about 6.

In one embodiment, the compositions described herein are particularly useful in lapping steel substrates. These compositions desirably contain a salt of polyaspartic acid, active chemicals includes oxalic acid and various phosphorus based acids and their salts, as described above and which are widely available and inexpensive. In view of the deficiencies of oxalic and phosphorus based conversion coatings previously discussed, the inventors introduced organic based phosphorus acids and salts thereof and water soluble organic amines into the composition described herein. The introduction of the organic based phosphorus acids and salts thereof permitted gear lapping to be performed at commercial speeds. Further, the amines permitted the use of more oxalic and various phosphorous based acids in the composition. Examples of organic based phosphorus acids and salts thereof active chemicals useful in the compositions include, but are not limited to, phytic, glycerophosphoric, 2-ethylhexyl phosphoric, butylphosphonic acids and their salts. Examples of amine active chemicals useful in the composition include, without limitation, alkanolamines such as triethanolamine. Further, the inclusion of loose grains and grits in this composition permitted the use of excess oxalic and phosphorus compounds, beyond their normal solubility at room temperature. The inventors found that the excess oxalic and phosphorus compounds were absorbed by the loose grains and grits. The inventors hypothesized that the absorbed oxalic and phosphorus compounds were dispersed on the surfaces of the loose grains and/or grits either in molecular monolayer or as nanoparticles, which then permitted the direct reaction between the same and the metal surface. By doing so, the compositions permitted the lapping and polishing of metal substrates to complete in minutes instead of hours.

The product can be provided to the customer as a complete neat composition, requiring dilution; as a ready for use composition, requiring no dilution; or as a two part composition in which the grits are provided separate from the remainder of the solution and the customer is required to admix the grits into the other components prior to use with dilution optional.

In one example, a product is provided and includes a first container which contains at least about 3% by weight of a salt of polyaspartic acid and one or more chemical compounds useful for finishing a metal substrate. The product may also contain a second container which contains one or more of a grit. Upon use, the customer mixes the grit from the second container into the components of the first container.

For example, the first container optionally contains citric acid, sodium tripolyphosphate, anhydrous monosodium pyrophosphate, disodium dihydrogen pyrophosphate, sodium carboxymethylcellulose, sodium salt of polyaspartic acid, and sodium 3-nitrobenzenesulfonate. In another example, the first container contains about 76% by weight of water, about 9.5% by weight of the sodium salt of polyaspartic acid, about 5% by weight of citric acid, about 4% by weight of sodium tripolyphosphate, about 0.3% by weight of anhydrous monosodium pyrophosphate, about 3% by weight of disodium dihydrogen pyrophosphate, about 2% by weight of sodium carboxymethylcellulose; and about 0.3% by weight of sodium 3-nitrobenzenesulfonate.

In a further example, a first composition is provided and contains a salt of polyaspartic acid, sodium 3-nitrobenzenesulfonate, citric acid, sodium tripolyphosphate, anhydrous monosodium phosphate, disodium dihydrogen pyrophosphate, and sodium carboxymethylcellulose.

In still a further example, a first composition is provided and includes water, at least 9% by weight of a sodium salt of polyaspartic acid, sodium 3-nitrobenzenesulfonate, citric acid, sodium tripolyphosphate, anhydrous monosodium phosphate, disodium dihydrogen pyrophosphate, and sodium carboxymethyl cellulose.

In an example of a complete composition, the composition includes water, sodium salt of polyaspartic acid, sodium 3-nitrobenzenesulfonate, citric acid, sodium tripolyphosphate, anhydrous monosodium phosphate, disodium dihydrogen pyrophosphate, a grit, and sodium carboxymethyl cellulose.

In a further example, a composition is provided and includes about 24.4% by weight of water, about 3% by weight of the sodium salt of polyaspartic acid, about 1.6% by weight of citric acid, about 1.2% by weight of sodium tripolyphosphate, about 0.1% by weight of anhydrous monosodium pyrophosphate, about 1% by weight of disodium dihydrogen pyrophosphate, about 68% by weight of zirconium, aluminum, and hafnium oxides, about 0.6% by weight of sodium carboxymethylcellulose, and about 0.1% by weight of sodium 3-nitrobenzenesulfonate.

In still a further example, a composition is provided and includes about 10 to about 30% by weight of water, about 0.01% to about 12% by weight of the sodium salt of polyaspartic acid, about 0.01 to about 10% by weight of citric acid, about 0.01 to about 5% by weight of sodium tripolyphosphate, about 0.01 to about 5% by weight of anhydrous monosodium pyrophosphate, about 0.01 to about 5% by weight of disodium dihydrogen pyrophosphate, and about 0.01 to about 2% by weight of sodium carboxymethylcellulose.

In yet another example, a composition is provided and includes about 10 to about 30% by weight of water, about 9% by weight of the sodium salt of polyaspartic acid, about 0.01 to about 10% by weight of citric acid, about 0.01 to about 5% by weight of sodium tripolyphosphate, about 0.01 to about 5% by weight of anhydrous monosodium pyrophosphate, about 0.01 to about 5% by weight of disodium dihydrogen pyrophosphate, and about 0.01 to about 2% by weight of sodium carboxymethylcellulose.

In a further example, a composition is provided and contains about 10 to about 30% by weight of water, about 0.01 to about 12% by weight of the sodium salt of polyaspartic acid, about 0.01 to about 10% by weight of citric acid, about 0.01 to about 5% by weight of sodium tripolyphosphate, about 0.01 to about 5% by weight of anhydrous monosodium pyrophosphate, about 0.01 to about 5% by weight of disodium dihydrogen pyrophosphate, about 0.01 to about 2% by weight of sodium carboxymethylcellulose, about 0.01% to about 3% by weight of sodium 3-nitrobenzenesulfonate; and about 25% to about 75% by weight of zirconium, aluminum, and hafnium oxides.

In still another example, a composition is provided and contains a salt of polyaspartic acid, oxalic acid, and a grit. This composition may further contain one or more chemical compounds useful for polishing a metal substrate.

The compositions described herein are typically prepared by combining the components of the composition in a reactor. One skilled in the art would readily be able to select a suitable reactor for use thereof. Desirably, the compositions are prepared at room temperature or above. In one embodiment, the composition is prepared by combining warm water and the other components of the composition and then adding the loose grains and grits. By adding the grits separately to the remainder of the composition at an elevated temperature, the inventors found that the solubility of the other components was increased. In another embodiment, the composition is prepared at room temperature. This method includes combining the room temperature water with the other components of the composition, followed by addition of the loose grains and grits. Efficient and extended agitation may be required if the room temperature method is utilized. Thickeners, if utilized as a component of the composition, are typically added last. In one embodiment, the compositions are prepared using a pump. One skilled in the art would readily be able to determine when the components of the composition have been sufficiently combined and a uniform mixture thereof has been obtained. Typically, the uniformity of the composition is determined by density or visually.

The compositions described herein may be prepared and provided in several forms. In one example, the composition is prepared by combining all of the components including the carrier, sodium salt of polyaspartic acid, and one or more active chemicals. This composition may then be utilized without further modification. In another example, the composition is prepared by combining the sodium salt of polyaspartic acid, one or more active chemicals, and the grit. Prior to use, this composition is combined with the carrier, which may be separately purchased by the customer. Alternatively, the composition may be present in a product in one container, whereby a second container may be present in the product and separately include the carrier. In a further example, the composition is prepared by combining the sodium salt of polyaspartic acid, one or more active chemicals, and the carrier. Prior to use, this composition is combined with the grit, which may be separately purchased by the customer. Alternatively, the composition may be present in a product in one container, whereby a second container may be present in the product and separately include the grit.

In one embodiment, a product is provided and includes a first container containing at least about 3% by weight of a salt of polyaspartic acid and one or more chemical compounds useful for finishing a metal substrate and a second container containing one or more of a grit. In one example, the first container contains about 9.5% by weight of the sodium salt of polyaspartic acid. In a further example, the first container also contains citric acid, sodium tripolyphosphate, anhydrous monosodium pyrophosphate, disodium dihydrogen pyrophosphate, sodium 3-nitrobenzenesulfonate, and sodium carboxymethylcellulose. In another example, the first container contains about 76% by weight of water, about 9.5% by weight of the sodium salt of polyaspartic acid, about 5% by weight of citric acid, about 4% by weight of sodium tripolyphosphate, about 0.3% by weight of anhydrous monosodium pyrophosphate, about 3% by weight of disodium dihydrogen pyrophosphate, about 2% by weight of sodium carboxymethylcellulose; and about 0.3% by weight of sodium 3-nitrobenzenesulfonate.

Still other compositions are able to be assembled by one skilled in the art given this description and the knowledge of the art.

B. Methods of Lapping Metal Objects Using the Aqueous Based Lapping and Polishing Compound The compositions described herein can be utilized for a variety of purposes and in a variety of industries. In one embodiment, the compositions are useful for polishing metal substrates, and specifically, metal surfaces, and may be utilized on any commercial lapping equipment. In another embodiment, the compositions are useful for lapping gears. In a further embodiment, the compositions are useful treating metal substrates using vibratory processes.

Typically, the metal is treated using the composition and polished using the same. In one example, the composition is supplied to the metal using a central tank. In another example, the composition is fed to metal using an individual holding vessel. In a further example, the composition is added via nozzles through a circulation system to mesh gear surfaces. However, the method utilized to contact the metal with the composition is not a limitation on the present invention. When the composition is applied to a gear, the composition polishes the metal using techniques known to those skilled in the art of lapping gears. Various modifications may be made by one skilled in the art. One skilled in the art would also recognize when the metal surface, i.e., gear, has been sufficiently lapped using techniques in the art. For example, one skilled in the art would be able to examine the metal surface, i.e., gear surface, by instruments or visually to determine the smoothness and pitting of the metal and thereby completion of the process.

Alternatively, the compositions described herein are useful for polishing metal substrates using vibratory processes. Typically, compositions useful for this purpose contain loose grains and grits. In one example, the composition is applied to the metal. In a further example, the metal is immersed in the composition.

C. Method of Refortifying and Recycling the Aqueous Based Lapping and Polishing Compound To further reduce lapping cost and increase environmental friendliness, a method is also provided for refortifying and recycling the compositions described herein. The inventors found that methods of reusing and recycling oil based lapping compounds are economically unfeasible for a variety of reasons. For example, the loose abrasives in the spent oil based lapping compound typically lose their cutting ability. In addition, separation of oil from the loose abrasives in the oil-based compositions in the art requires considerably more energy. Therefore, since the most expensive component of a lapping composition tends to be the loose grains and grits, recovery of this component was advantageous.

Since the composition described herein permits commercial lapping of metal substrates to be performed at lower pressures, less cutting action is required from the loose grains and grits at these lower pressures. Therefore, the loose grain and grits have a prolonged working life and can be recycled for reuse at a late date.

In one embodiment, the loose grains and grits are recycled and reused by collecting the spent, i.e., used, composition and refortifying it by adding more components of the original composition into the spent composition. The terms "spent" or "used" describe a composition provided herein that has been utilized to polish, treat, or lap a metal substrate surface. This used/spent composition may be collected by one skilled in the art and utilized as described herein.

In one example, the additional components are added incrementally to the holding tank during the lapping operation. In another example, the additional components are all added at once in a centralized waste holding vessel where the spent composition is lapping collected. The amount of each component added to the spent composition may be determined by one skilled in the art. The spent lapping composition may also be diluted with water, if necessary.

In another example, the loose grains and grits may be collected from the spent lapping composition. A variety of procedures known to those skilled in the art may be utilized to collect the loose grains and grits and include, without limitation, centrifugation and filtration. The isolated loose grains and grits can then be further washed using clean water, if required. These recovered loose grains and grits may then be reused for preparation of new batches of the lapping and polishing compound.

In one example, a method is provided for preparing a composition for lapping gears including analyzing the components of a used composition and adding one or more of a salt of polyaspartic acid, water, grit, and/or active chemical to the used composition. By doing so, a composition useful for polishing metal is provided.

In a further example, a method is provided for preparing a composition for lapping gears including analyzing the components of a used composition and adding one or more of a salt of polyaspartic acid, water, a thickening agent, accelerator, acid, grit, and phosphate salt to the used composition. By doing so, a composition useful for polishing metal is provided.

In another example, a method for recycling grits from a used composition is provided. This method includes isolating the grits from the used composition. One skilled in the art would readily be able to isolate the grits using techniques in the art including filtration, centrifugation, among others. The isolated grits may then be washed, preferably using water.

The following examples are illustrative only and are not intended to be a limitation on the present invention.

EXAMPLES

Example 1

Preparation of a Composition Containing Salt of Polyaspartic Acid

This example describes the preparation of a composition containing at least 9% by weight of a salt of polyaspartic acid. This composition was prepared by combining water (7000 g), the sodium salt of polyaspartic acid (735 g in 40% concentration and 830 g in 80% concentration), sodium 3-nitrobenzenesulfonate (45 g), citric acid (500 g), sodium tripolyphosphate (375 g), anhydrous monosodium phosphate (45 g), disodium dihydrogen pyrophosphate (280 g), and carboxymethylcellulose (190 g). The solution was stirred for 6 hours to provide a clear solution.

Example 2

Metal Surface Finishing Using a Composition Containing a Salt of Polyaspartic Acid The composition prepared as described in Example 1 was applied to a metal substrate in a vibratory bow using ceramic media. After 2 hours of vibration, the surface smoothness of the processed metal substrate was better than metal substrates that were processed using the composition of Example 1, but lacking the sodium salt of polyaspartic acid.

Example 3

Gear Lapping Using a Composition Containing a Salt of Polyaspartic Acid

The gear lapping was performed on equipment manufactured by Gleason Works. The pattern of motion for the gear lapping was three dimensional, namely in the direction of G, H, and V, which is readily understood by those skilled in the art. The operating pressure varied from about 1 to about 3000 psi. The lapping composition prepared as described in Example 1 was supplied from an individual tank attached to the lapping machine and was introduced to the meshing tooth surface of two gears under load conditions through nozzles near the meshing point of the teeth. The exact motion pattern and duration were based on the existing gear production protocol using oil based lapping compounds known in the art. After the operation, the processed gears were simply rinsed with water and mounted onto testing equipment to examine both the lapping pattern and noise level. If necessary, the described lapping procedure was repeated, and progress of lapping was examined again with the testing equipment.

The data showed that the compositions prepared in Example 1 resulted in improved lapping pattern of the gears in comparison with the composition made from all the ingredients in Example 1 except the sodium salt of polyaspartic acid.

Example 4

Preparation of a Composition Containing a Salt of Polyaspartic Acid and Grains/Grits The composition prepared as described in Example 1 was combined with zirconium, aluminum, and hafnium oxides (21,560 g) for about 4 hours using a high speed agitator to provide a uniform dense muddy material.

Example 5

Gear Lapping Using a Composition Containing a Salt of Polyaspartic Acid and Grains/Grits The gear lapping was performed on equipment manufactured by Gleason Works. The pattern of motion for the gear lapping was three dimensional, namely in the direction of G, H, and V, which is readily understood by those skilled in the art. The operating pressure varied from about 1 to about 3000 psi. The lapping composition prepared as described in Example 4 was supplied from an individual tank attached to the lapping machine and was introduced to the meshing tooth surface of two gears under load conditions through nozzles near the meshing point of the teeth. The exact motion pattern and duration were based on the existing gear production protocol using oil based lapping compounds known in the art. After the operation, the processed gears were simply rinsed with water and mounted onto testing equipment to examine both the lapping pattern and by noise level. If necessary, the described lapping procedure was repeated, and progress of lapping was examined again with the testing equipment.

The data illustrated that the composition was effective as a lapping and polishing composition. Specifically, this composition was effective at lapping gears to produce a set of gears with a desirable lapping pattern. In addition, the lapped gears using the compositions reduced noise levels and were only one-fifth as noisy as the gears lapped using oil-based lapping compositions available in the art.

Example 6

Reusing a Spent Composition for Lapping Gears

The spent composition from Example 5 is collected and the components are analyzed by techniques known to those in the art. The composition is then modified by adding additional components to ensure that the required components of the composition as set forth in Example 4 are present and the mixture stirred. The mixture is then utilized in another process of lapping gears, as described in Example 5.

Example 7

Recycling Components of a Spent Lapping Composition

The spent composition (100 g) from Example 5 was diluted with water (400 g) and then subjected to centrifugation. The aqueous solution was decanted and the loose grains and grits were operationally washed and dried. These recovered loose grains and grits were ready for reuse in the preparation of a new lapping composition.

Example 8

Recycling Components of a Spent Lapping Composition

The spent composition (100 g) from Example 5 was diluted with water (400 g) and then subjected to filtration. The recovered loose grains and grits were operationally washed and dried. These recovered loose grains and grits were ready for reuse in the preparation of a new lapping composition.

All publications cited in this specification are incorporated herein by reference. While the invention has been described with reference to particular embodiments, it will be appreciated that modifications can be made without departing from the spirit of the invention. Such modifications are intended to fall within the scope of the appended claims.

What is claimed is:

1. A composition consisting of a salt of polyaspartic acid, sodium 3-nitrobenzenesulfonate, citric acid, sodium tripolyphosphate, anhydrous monosodium phosphate, disodium dihydrogen pyrophosphate, and sodium carboxymethylcellulose.

2. The composition according to claim 1, wherein said salt of polyaspartic acid is the sodium salt of polyaspartic acid.

3. The composition according to claim 1, consisting of at least about 9% by weight of a salt of polyaspartic acid.

4. The composition according to claim 1, consisting of at least about 9.5% by weight of a salt of polyaspartic acid.

5. A product consisting of
   (i) a container consisting of the composition of claim 1; and
   (ii) a container consisting of one or more of a grit.

6. A composition consisting of a salt of polyaspartic acid, a grit, sodium 3-nitrobenzenesulfonate, citric acid, sodium tripolyphosphate, anhydrous monosodium phosphate, disodium dihydrogen pyrophosphate, and sodium carboxymethylcellulose.

7. A composition consisting of water, a salt of polyaspartic acid, sodium 3-nitrobenzenesulfonate, citric acid, sodium tripolyphosphate, anhydrous monosodium phosphate, disodium dihydrogen pyrophosphate, a grit, and sodium carboxymethyl cellulose.

8. The composition according to claim 7, consisting of:
   (a) about 24.4% by weight of water;
   (b) about 3% by weight of the sodium salt of polyaspartic acid;
   (c) about 1.6% by weight of citric acid;
   (d) about 1.2% by weight of sodium tripolyphosphate;
   (e) about 0.1% by weight of anhydrous monosodium pyrophosphate;
   (f) about 1% by weight of disodium dihydrogen pyrophosphate;
   (g) about 68% by weight of zirconium, aluminum, and hafnium oxides;
   (h) about 0.6% by weight of sodium carboxymethylcellulose; and
   (i) about 0.1% by weight of sodium 3-nitrobenzenesulfonate.

9. The composition according to claim 7, consisting of
   (a) about 10 to about 30% by weight of water;
   (b) about 0.01 to about 12% by weight of the sodium salt of polyaspartic acid;
   (c) about 0.01 to about 10% by weight of citric acid;
   (d) about 0.01 to about 5% by weight of sodium tripolyphosphate;
   (e) about 0.01 to about 5% by weight of anhydrous monosodium pyrophosphate;
   (f) about 0.01 to about 5% by weight of disodium dihydrogen pyrophosphate;
   (g) about 0.01 to about 2% by weight of sodium carboxymethylcellulose;
   (h) about 0.01% to about 3% by weight of sodium 3-nitrobenzenesulfonate; and
   (i) about 25% to about 75% by weight of zirconium, aluminum, and hafnium oxides.

10. A composition consisting of:
    (i) about 10 to about 30% by weight of water;
    (ii) about 0.01 to about 12% by weight of the sodium salt of polyaspartic acid;
    (iii) about 0.01 to about 10% by weight of oxalic acid;
    (iv) about 0.01 to about 5% by weight of sodium tripolyphosphate;
    (v) about 0.01 to about 5% by weight of anhydrous monosodium pyrophosphate;
    (vi) about 0.01 to about 5% by weight of disodium dihydrogen pyrophosphate;
    (vii) about 0.01 to about 2% by weight of sodium carboxymethylcellulose;
    (viii) about 0.01% to about 3% by weight of sodium 3-nitrobenzenesulfonate; and
    (ix) about 25% to about 75% by weight of a grit.

11. A composition consisting of:
    (a) about 10 to about 30% by weight of water;
    (b) about 0.01 to about 12% by weight of the sodium salt of polyaspartic acid;
    (c) about 0.01 to about 10% by weight of citric acid;
    (d) about 0.01 to about 5% by weight of sodium tripolyphosphate;
    (e) about 0.01 to about 5% by weight of anhydrous monosodium pyrophosphate;
    (f) about 0.01 to about 5% by weight of disodium dihydrogen pyrophosphate;
    (g) about 0.01 to about 2% by weight of sodium carboxymethylcellulose;
    (h) about 0.01% to about 3% by weight of sodium 3-nitrobenzenesulfonate; and
    (i) about 25% to about 75% by weight of a grit.

* * * * *